United States Patent [19]

Fillios

[11] Patent Number: 5,457,910

[45] Date of Patent: Oct. 17, 1995

[54] SHELTER-TRAP FOR CRUSTACEANS

[76] Inventor: Jean-Pierre R. Fillios, P.O. Box AB20 383 Marsh Harbor, Abaco, Bahamas Ft. Lauderdale, Fla. 33301

[21] Appl. No.: 172,059

[22] Filed: Dec. 23, 1993

Related U.S. Application Data

[63] Continuation-in-part of Ser. No. 59,661, May 12, 1993, abandoned.

[51] Int. Cl.$^6$ ............................................. A01K 71/00
[52] U.S. Cl. ................................................ 43/102; 43/105
[58] Field of Search ............................ 43/100, 101, 102, 43/103, 104, 105, 106

[56] References Cited

U.S. PATENT DOCUMENTS

| | | | |
|---|---|---|---|
| 2,218,843 | 10/1940 | Fuller, Jr. | 43/105 |
| 2,584,643 | 2/1952 | Vander Clute | 43/105 |
| 3,867,782 | 2/1975 | Ortiz | 43/105 |
| 4,030,232 | 6/1977 | Niva | 43/105 |
| 4,654,997 | 4/1987 | Ponzo | 43/102 |
| 4,765,088 | 8/1988 | Stuart | 43/105 |
| 5,353,541 | 10/1994 | Jonason et al. | 43/105 |

*Primary Examiner*—Mark Rosenbaum
*Assistant Examiner*—Chuck Y. Mah
*Attorney, Agent, or Firm*—Pollock, Vande Sande & Priddy

[57] ABSTRACT

A shelter for crustaceans adapted to convert to a trap to facilitate harvesting. The shelter is a rectangular structure with a sound- and light-impervious and end walls, and a corrugated metal roof. The side of the structure are constituted by hinged doors pivotable from a horizontal position allowing access to the interior of the shelter to a vertical position closing such access. The movement from open to closed position is effected by cables having one end attached to the door and the other end to a marker float via a main cable.

7 Claims, 2 Drawing Sheets

SHELTER-TRAP FOR CRUSTACEANS

CROSS-REFERENCE TO RELATED APPLICATION

This is a continuation-in-part application of U.S. patent application Ser. No. 08/059,661 filed May 12, 1993, now abandoned.

FIELD OF THE INVENTION

The present invention relates to a shelter for crustaceans, such as lobsters and crabs, which becomes a trap when a cable attached thereto is pulled upward.

BACKGROUND OF THE INVENTION

Shelters for crustaceans such as lobsters are well-known in the art. They attract crustaceans during the off-seasons as breeding places. The crustaceans are attracted to dark shelters by day as much as they are by food at night. All year round they provide protection against predators for small and large lobsters, and during the off-seasons they serve as breeding grounds. However, conventional shelters have the serious drawbacks that they are not impervious to light and sound and hence do not constitute attractive shelters, and that, to harvest the sheltered crustaceans, it is necessary for fishermen to risk their lives by diving.

As for conventional traps, these have the ecological drawback that, if they become loosened from their floats, the crustaceans resident therein continue to attract other crustaceans, all of these eventually dying of starvation, until the trap decays.

SUMMARY OF THE INVENTION

The present invention is designed to overcome these disadvantages by providing a shelter which is largely impervious to sound and light, and which is easily convertible into a trap which can be pulled to the surface for the purpose of selectively harvesting the resident crustaceans, and can then be submerged to serve again as a shelter. The device is relatively simple and extremely inexpensive, and greatly enhances the safety of fishermen, productivity and ecology.

BRIEF DESCRIPTION OF THE DRAWINGS

In order that the invention may be more clearly understood, references will now be made to the attached drawing, in which an embodiment of the invention is shown for purposes of illustration, and in which.

DESCRIPTION OF PREFERRED EMBODIMENT

Figure 1:
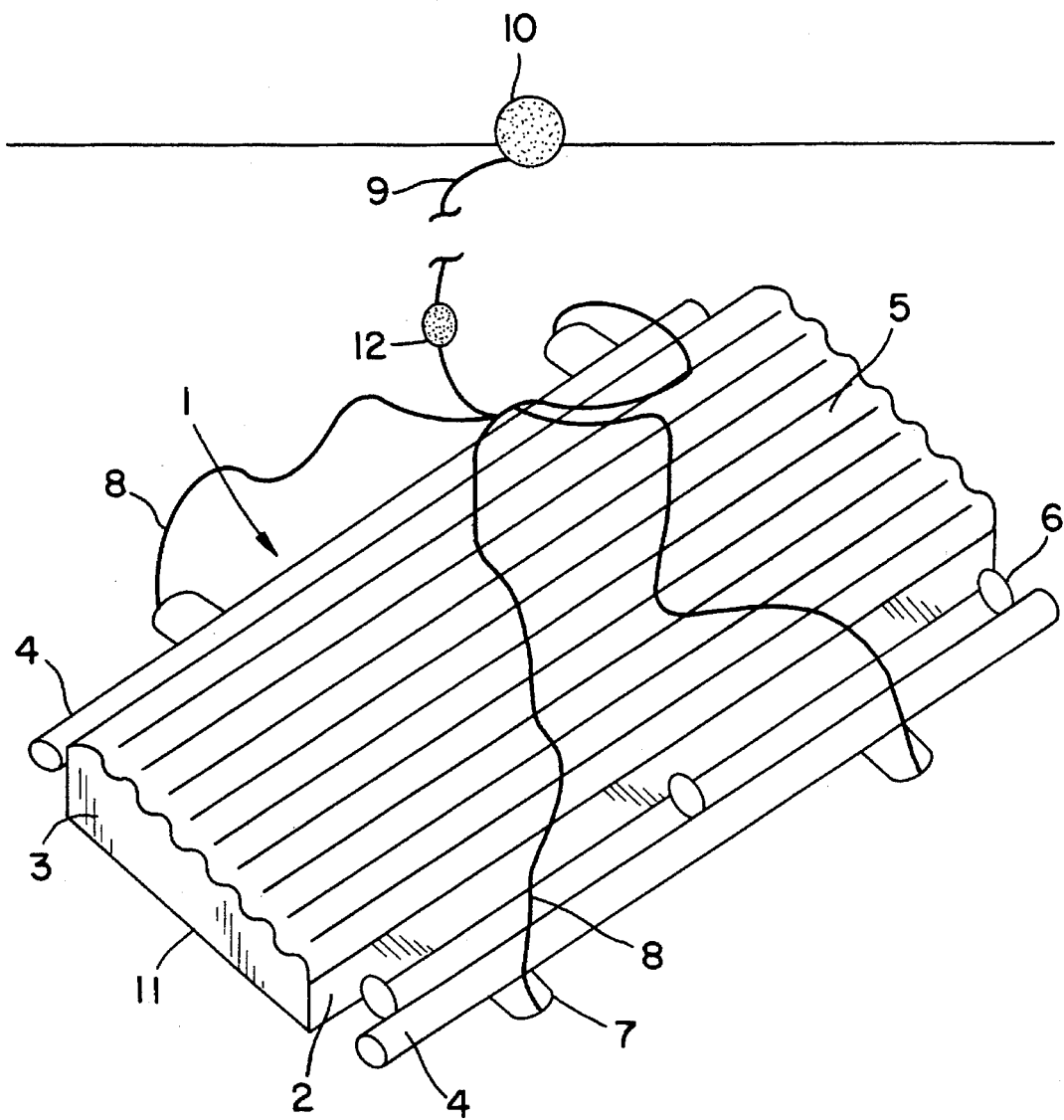
FIG. 1 is a perspective view of the shelter-trap device according to the present invention.
Figure 2:
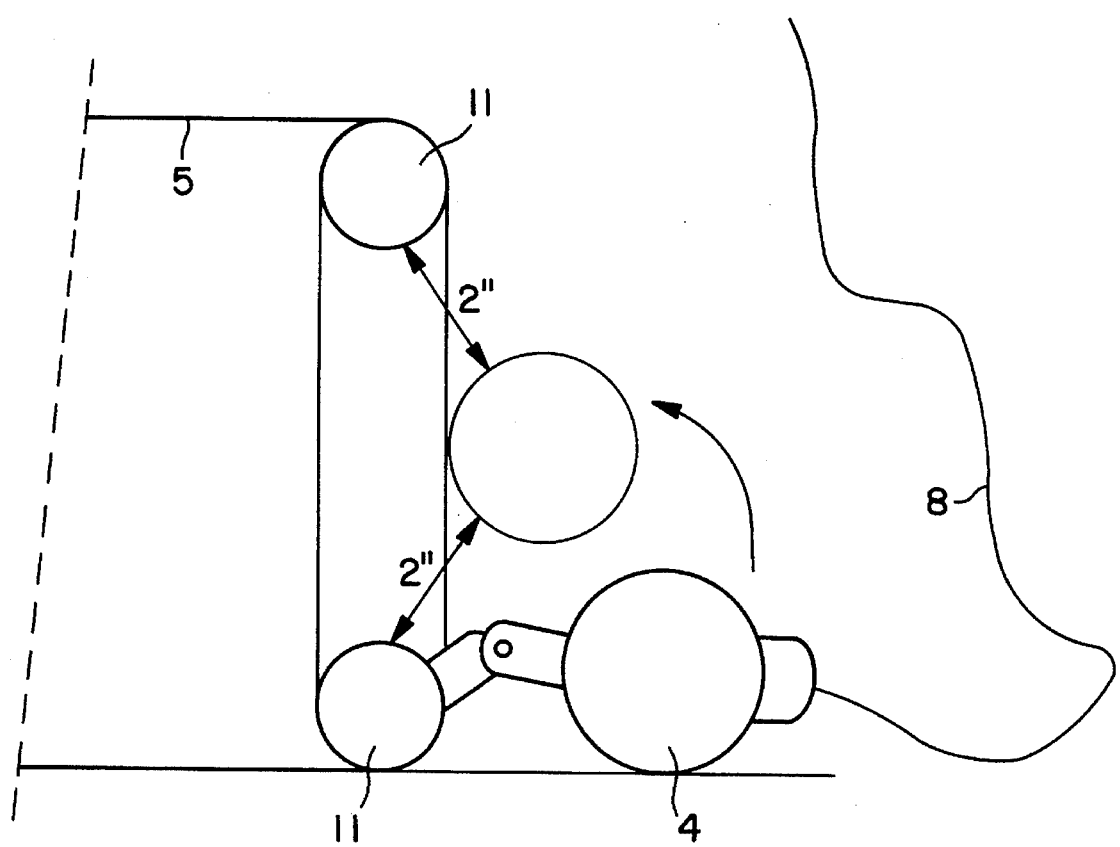
FIG. 2 is a detail view of the longitudinal door portion of the shelter-trap.

The shelter-trap according to the invention is a generally rectangular structure 1 whose dimensions may vary as a function of the species to be attracted and the size of the boat pulling the shelter-trap. For spiny lobsters, it has been found that a shelter about eight feet in length, at least three feet in width and about six inches in height is suitable. It is critical that the height dimension be just large enough to permit crustaceans to enter, but not large enough to permit the entry of their natural enemies, such as nurse sharks. The bottom 2 and the short sides 3 of the shelter-trap may be made of wood, but are preferably constituted by galvanized steel sheets framed by galvanized steel pipes 11, which are coated to prevent corrosion and which are impervious to light and sound.

The short sides 3 of the shelter-trap are always in upright position supporting the ends of a roof element 5 of corrugated galvanized sheet metal extending over the entire length of the shelter-trap and preventing the entry of light during both daytime and moonlit nights. The crustaceans being scared by noise, the top, bottom and short sides of the shelter-trap may be covered with a non-toxic sound muffler, such as tar, plastic or inexpensive carpeting. At least one, but preferably both, of the long sides 4 of the shelter-trap, however, are constituted by door pipes attached to the bottom 2 by hinges 6, and are normally in a generally horizontal position providing access to the interior of the shelter-trap. Two or three hinges can be provided for each of the door pipes, two at their ends and an optional third one in the center; obviously, it is also possible to provide more than three hinges.

The radially outward edges of the door pipes are provided with loops 7. The ends of secondary cables 8 whose other ends join to form a main cable 9 attached to a main marker float 10 and a secondary marker float 12 are attached to these loops. Typically, two loops are provided for each door, with one secondary cable attached to each loop. Main cable 9 is long enough to reach the water surface at the highest tides and waves, but the weight of the door pipes outweighs the pull of floats 10 and 12, thereby preventing partial closing of the doors under the effect of waves on the main float. The weight of the door pipes can be increased, e.g., by pouring concrete inside them or by using heavier water class steel pipes.

The secondary float 12 keeps light tension on secondary cables 8 insufficient to close long sides 4, in order to avoid noise causing discomfort to crustaceans occupying the shelter, and effect of waves. The pipes constituting the doors when in the closed position leave between them and the frame of the shelter-trap clearance spaces large enough to allow undersized crustaceans to escape while the shelter-trap is being pulled. These clearance spaces also allow the antennas and appendages of legal-sized lobsters to be gently pushed under or over the pipes when the doors are being closed; this prevents them from being crushed, as would happen with a fiat or meshed surface.

The pipes constituting the doors may be longer than the shelter-trap body, in order to provide projections which permit the shelter-trap to be hung by one of the doors on a double support installed on the deck of the boat: the cables then being slack, the doors will open vertically, permitting the trap to be emptied by force of gravity.

Once the tension on the main cable is released, the doors reopen by force of gravity, the trap again becomes a shelter, and the cycle resumes.

Should the shelter become detached from the market float, this does not result in the death of its occupants, since the access doors remain open. Instead the device simply becomes a shelter permanently protecting the crustaceans housed therein.

What is claimed is:

1. Shelter-trap device for permanently housing crustaceans and for harvesting said crustaceans during open season, said device comprising a generally rectangular structure having a bottom, short vertical side elements attached to ends of said bottom, a roof element connecting said short vertical side elements, said bottom, short vertical side elements and roof element being made of material which is substantially impervious to the entry of sound and light, and at least one long side element extending the full length of said device and forming door means, hinges being provided for attaching said door means to opposite longitudinal sides of said bottom for pivoting movement between a first position providing access to an interior of said shelter-trap for crustaceans but not for predators larger than crustaceans, and a second, generally vertical position at least partly closing off access to said interior and trapping crustaceans sheltered therein.

2. Shelter-trap device according to claim 1, wherein each of said door means is constituted by at least one pipe provided with at least one loop for attachment of secondary cables which join to form a main cable attached to a marker float, whereby tensioning of said main cable is transmitted to said secondary cables to cause displacement of said door means from said first position to said second position.

3. Shelter-trap device according to claim 2, comprising two of said loops on each of said door means and a secondary cable attached to each of said loops.

4. Shelter-trap device according to claim 1, wherein said bottom and said short side elements are made of steel galvanized sheets framed by steel piping.

5. Shelter-trap device according to claim 1, wherein said roof element is made of corrugated sheet metal.

6. Shelter-trap device according to claim 1, said device having a height of about six inches, a length of about eight feet and a width of at least three feet.

7. Shelter-trap device according to claim 1, wherein said door means in said second position leave clearance space allowing undersized crustaceans to escape and preventing injury to legal-sized crustaceans.

\* \* \* \* \*

UNITED STATES PATENT AND TRADEMARK OFFICE
CERTIFICATE OF CORRECTION

PATENT NO. :   5,457,910
DATED      :   October 17, 1995
INVENTOR(S):   Jean-Pierre R. Fillios It is certified that error appears in the above-identified patent and that said Letters Patent is hereby corrected as shown below: On the title page,

[76] Please delete "Ft. Lauderdale, Fla. 33301".

Signed and Sealed this

Twentieth Day of July, 1999

Attest:

Attesting Officer

Q. TODD DICKINSON

Acting Commissioner of Patents and Trademarks